US009256575B2

(12) United States Patent
Vorbach et al.

(10) Patent No.: US 9,256,575 B2
(45) Date of Patent: *Feb. 9, 2016

(54) DATA PROCESSOR CHIP WITH FLEXIBLE BUS SYSTEM

(71) Applicant: PACT XPP TECHNOLOGIES AG, Munich (DE)

(72) Inventors: Martin Vorbach, Lingenfeld (DE); Frank May, Munich (DE); Dirk Reichardt, Munich (DE); Frank Lier, Munich (DE); Gerd Ehlers, Grasbrunn (DE); Armin Nückel, Neupotz (DE); Volker Baumgarte, Munich (DE); Prashant Rao, Munich (DE); Jens Oertel, Bad Bergazabern (DE)

(73) Assignee: PACT XPP TECHNOLOGIES AG, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/718,516

(22) Filed: May 21, 2015

(65) Prior Publication Data

US 2015/0261722 A1  Sep. 17, 2015

Related U.S. Application Data

(63) Continuation of application No. 13/903,470, filed on May 28, 2013, now Pat. No. 9,047,440, which is a continuation of application No. 13/289,296, filed on Nov. 4, 2011, now Pat. No. 8,471,593, which is a (Continued)

(30) Foreign Application Priority Data

| Oct. 9, 2000 | (WO) | PCT/EP00/10516 |
|---|---|---|
| Mar. 5, 2001 | (DE) | 101 10 530 |
| Mar. 7, 2001 | (DE) | 101 11 014 |
| Jul. 24, 2001 | (DE) | 101 35 210 |
| Jul. 24, 2001 | (DE) | 101 35 211 |
| Aug. 16, 2001 | (DE) | 101 39 170 |
| Aug. 29, 2001 | (DE) | 101 42 231 |
| Sep. 3, 2001 | (DE) | 101 42 894 |
| Sep. 3, 2001 | (DE) | 101 42 903 |
| Sep. 3, 2001 | (DE) | 101 42 904 |
| Sep. 11, 2001 | (DE) | 101 44 732 |
| Sep. 11, 2001 | (DE) | 101 44 733 |
| Sep. 17, 2001 | (DE) | 101 45 792 |
| Sep. 17, 2001 | (DE) | 101 45 795 |
| Sep. 19, 2001 | (DE) | 101 46 132 |
| Sep. 30, 2001 | (WO) | PCT/EP01/11299 |

(51) Int. Cl.
*G06F 7/52* (2006.01)
*G06F 15/80* (2006.01)
(Continued)

(52) U.S. Cl.
CPC .......... *G06F 15/7825* (2013.01); *G06F 9/3001* (2013.01); *G06F 13/4022* (2013.01); *G06F 15/80* (2013.01); *G06F 15/8023* (2013.01); *G06F 15/8092* (2013.01)

(58) Field of Classification Search
CPC . G06F 15/80; G06F 15/7867; G06F 15/8023; G06F 9/30109; G06F 15/803; G06F 15/17381; G06F 9/30098; G06F 9/3824; G06F 15/17387; G06F 2211/002; H03K 19/173; H03K 19/17748; H03K 19/17764
See application file for complete search history.

(56) References Cited

U.S. PATENT DOCUMENTS

| 4,412,303 A | 10/1983 | Barnes et al. |
| 4,454,578 A | 6/1984 | Matsumoto et al. |

(Continued)

FOREIGN PATENT DOCUMENTS

WO  WO9525306  9/1995

OTHER PUBLICATIONS

Katherine Compton, Scott Hauck, Reconfigurable computing: a survey of systems and software, ACM Computing Surveys (CSUR), v.34 n. 2, p. 171-21 0, Jun. 2002.

(Continued)

*Primary Examiner* — Vibol Tan
(74) *Attorney, Agent, or Firm* — Edward P. Heller, III

(57) ABSTRACT

A data processor chip having a two-dimensional array of arithmetic logic units and memory where the arithmetic logic units are in communication with memory units in one dimension and with other arithmetic units in a second.

11 Claims, 11 Drawing Sheets

Related U.S. Application Data continuation of application No. 12/371,040, filed on Feb. 13, 2009, now Pat. No. 8,058,899, which is a continuation of application No. 10/398,546, filed as application No. PCT/EP01/11593 on Oct. 8, 2001, now Pat. No. 7,595,659.

(60) Provisional application No. 60/238,855, filed on Oct. 6, 2000.

(51) Int. Cl.
*G06F 15/78* (2006.01)
*G06F 9/30* (2006.01)
*G06F 13/40* (2006.01)

(56) References Cited

U.S. PATENT DOCUMENTS

| | | | |
|---|---|---|---|
| 4,539,637 A | 9/1985 | DeBruler | |
| 4,577,293 A | 3/1986 | Matick et al. | |
| 4,748,580 A | 5/1988 | Ashton et al. | |
| 4,837,735 A | 6/1989 | Allen, Jr. et al. | |
| 4,862,407 A | 8/1989 | Fette et al. | |
| 4,959,781 A | 9/1990 | Rubinstein et al. | |
| 5,070,475 A | 12/1991 | Normoyle et al. | |
| 5,081,575 A | 1/1992 | Hiller et al. | |
| 5,119,499 A | 6/1992 | Tonomura et al. | |
| 5,197,016 A | 3/1993 | Sugimoto et al. | |
| 5,261,113 A | 11/1993 | Jouppi | |
| 5,296,759 A | 3/1994 | Sutherland et al. | |
| 5,430,885 A | 7/1995 | Kaneko et al. | |
| 5,469,003 A | 11/1995 | Kean | |
| 5,572,680 A | 11/1996 | Ikeda et al. | |
| 5,581,778 A | 12/1996 | Chin et al. | |
| 5,651,137 A | 7/1997 | MacWilliams et al. | |
| 5,675,777 A | 10/1997 | Glickman | |
| 5,685,004 A | 11/1997 | Bruce et al. | |
| 5,721,921 A | 2/1998 | Kessler et al. | |
| 5,752,035 A | 5/1998 | Trimberger | |
| 5,765,009 A | 6/1998 | Ishizaka | |
| 5,774,704 A | 6/1998 | Williams | |
| 5,808,487 A | 9/1998 | Roy | |
| 5,812,844 A | 9/1998 | Jones et al. | |
| 5,832,288 A | 11/1998 | Wong | |
| 5,892,962 A | 4/1999 | Cloutier | |
| 5,893,165 A | 4/1999 | Ebrahim | |
| 5,898,602 A | 4/1999 | Rothman et al. | |
| 5,905,875 A | 5/1999 | Takahashi et al. | |
| 5,913,925 A | 6/1999 | Kahle et al. | |
| 5,915,123 A | 6/1999 | Mirsky et al. | |
| 5,933,642 A | 8/1999 | Greenbaum et al. | |
| 5,956,518 A | 9/1999 | DeHon et al. | |
| 5,966,534 A | 10/1999 | Cooke et al. | |
| 5,978,583 A | 11/1999 | Ekanadham et al. | |
| 5,978,830 A | 11/1999 | Nakaya et al. | |
| 5,990,910 A | 11/1999 | Laksono et al. | |
| 6,023,742 A | 2/2000 | Ebeling et al. | |
| 6,034,542 A | 3/2000 | Ridgeway | |
| 6,038,646 A | 3/2000 | Sproull | |
| 6,049,859 A | 4/2000 | Gliese et al. | |
| 6,052,773 A | 4/2000 | DeHon et al. | |
| 6,058,465 A | 5/2000 | Nguyen | |
| 6,075,935 A | 6/2000 | Ussery et al. | |
| 6,076,157 A | 6/2000 | Borkenhagen et al. | |
| 6,077,315 A | 6/2000 | Greenbaum et al. | |
| 6,096,091 A | 8/2000 | Hartmann | |
| 6,104,696 A | 8/2000 | Kadambi et al. | |
| 6,108,737 A | 8/2000 | Sharma et al. | |
| 6,119,219 A | 9/2000 | Webb et al. | |
| 6,122,719 A | 9/2000 | Mirsky et al. | |
| 6,122,720 A | 9/2000 | Cliff | |
| 6,124,868 A | 9/2000 | Asaro et al. | |
| 6,141,734 A | 10/2000 | Razdan et al. | |
| 6,148,407 A | 11/2000 | Aucsmith | |
| 6,209,020 B1 | 3/2001 | Angle et al. | |
| 6,209,065 B1 | 3/2001 | Van Doren et al. | |
| 6,215,326 B1 | 4/2001 | Jefferson et al. | |
| 6,216,174 B1 | 4/2001 | Scott et al. | |
| 6,219,833 B1 | 4/2001 | Solomon et al. | |
| 6,226,717 B1 | 5/2001 | Reuter et al. | |
| 6,237,059 B1 | 5/2001 | Dean et al. | |
| 6,263,406 B1 | 7/2001 | Uwano et al. | |
| 6,286,090 B1 | 9/2001 | Steely, Jr. et al. | |
| 6,289,369 B1 | 9/2001 | Sundaresan | |
| 6,308,191 B1 | 10/2001 | Dujardin et al. | |
| 6,314,484 B1 | 11/2001 | Zulian et al. | |
| 6,321,296 B1 | 11/2001 | Pescatore | |
| 6,321,298 B1 | 11/2001 | Hubis | |
| 6,341,318 B1 | 1/2002 | Dakhil | |
| 6,347,346 B1 | 2/2002 | Taylor | |
| 6,374,286 B1 | 4/2002 | Gee et al. | |
| 6,385,672 B1 | 5/2002 | Wang et al. | |
| 6,421,757 B1 | 7/2002 | Wang et al. | |
| 6,425,068 B1 * | 7/2002 | Vorbach et al. | 712/18 |
| 6,457,100 B1 | 9/2002 | Ignatowski et al. | |
| 6,467,009 B1 | 10/2002 | Winegarden et al. | |
| 6,501,999 B1 | 12/2002 | Cai | |
| 6,522,167 B1 | 2/2003 | Ansari et al. | |
| 6,526,430 B1 | 2/2003 | Hung et al. | |
| 6,538,470 B1 | 3/2003 | Langhammer et al. | |
| 6,539,438 B1 | 3/2003 | Ledzius et al. | |
| 6,571,322 B2 | 5/2003 | Arimilli et al. | |
| 6,587,939 B1 | 7/2003 | Takano | |
| 6,633,181 B1 | 10/2003 | Rupp | |
| 6,658,564 B1 | 12/2003 | Smith et al. | |
| 6,665,758 B1 | 12/2003 | Frazier et al. | |
| 6,708,325 B2 | 3/2004 | Cooke et al. | |
| 6,757,892 B1 | 6/2004 | Gokhale et al. | |
| 6,795,939 B2 | 9/2004 | Harris et al. | |
| 6,799,265 B1 | 9/2004 | Dakhil | |
| 6,865,662 B2 | 3/2005 | Wang | |
| 6,871,341 B1 | 3/2005 | Shyr | |
| 6,925,641 B1 | 8/2005 | Elabd | |
| 7,000,161 B1 | 2/2006 | Allen et al. | |
| 7,036,106 B1 | 4/2006 | Wang et al. | |
| 7,188,234 B2 | 3/2007 | Wu et al. | |
| 7,210,129 B2 | 4/2007 | May et al. | |
| 7,266,725 B2 | 9/2007 | Vorbach et al. | |
| 7,340,596 B1 | 3/2008 | Crosland et al. | |
| 7,581,076 B2 | 8/2009 | Vorbach | |
| 7,924,837 B1 | 4/2011 | Shabtay et al. | |
| 7,928,763 B2 | 4/2011 | Vorbach | |
| 7,933,838 B2 | 4/2011 | Ye | |
| 8,156,284 B2 | 4/2012 | Vorbach et al. | |
| 9,047,440 B2 * | 6/2015 | Vorbach et al. | |
| 2001/0003834 A1 | 6/2001 | Shimonishi Hideyuki | |
| 2001/0032305 A1 | 10/2001 | Barry | |
| 2002/0004916 A1 | 1/2002 | Marchand et al. | |
| 2002/0010840 A1 | 1/2002 | Barroso et al. | |
| 2002/0145545 A1 | 10/2002 | Brown | |
| 2003/0014743 A1 | 1/2003 | Cooke et al. | |
| 2003/0033514 A1 | 2/2003 | Appleby-Allis et al. | |
| 2003/0046530 A1 | 3/2003 | Poznanovic | |
| 2003/0101307 A1 | 5/2003 | Gemelli et al. | |
| 2003/0120904 A1 | 6/2003 | Sudharsanan et al. | |
| 2004/0093186 A1 | 5/2004 | Ebert et al. | |
| 2005/0080994 A1 | 4/2005 | Cohen et al. | |
| 2005/0257179 A1 | 11/2005 | Stauffer et al. | |
| 2006/0036988 A1 | 2/2006 | Allen et al. | |
| 2006/0095716 A1 | 5/2006 | Ramesh | |
| 2006/0259744 A1 | 11/2006 | Matthes | |
| 2007/0043965 A1 | 2/2007 | Mandelblat et al. | |
| 2007/0143577 A1 | 6/2007 | Smith | |
| 2007/0143578 A1 | 6/2007 | Horton et al. | |
| 2010/0153654 A1 | 6/2010 | Vorbach et al. | |
| 2011/0060942 A1 | 3/2011 | Vorbach | |
| 2011/0145547 A1 | 6/2011 | Vorbach | |
| 2012/0017066 A1 | 1/2012 | Vorbach et al. | |
| 2014/0297914 A1 | 10/2014 | Vorbach | |
| 2014/0297948 A1 | 10/2014 | Vorbach et al. | |

(56) References Cited

OTHER PUBLICATIONS

Goldberg D: "What Every Computer Scientist Should Know About Floating-Point Arithmetic", ACM Computing Surveys, ACM, New York, NY, US, vol. 23, No. 1, Mar. 1, 1991, pp. 5-48.

Hauser et al. "Garp: A MIPS Processor with a Reconfigurable Coprocessor", Apr. 1997, pp. 12-21.

Libo Huang et al: "A New Architecture for Multiple-Precision Floating-Point Multiply-Add Fused Unit Design" Computer Arithmetic, 2007. Arith '07. 18th IEEE Symposium on, IEEE, PI, Jun. 1, 2007, Seiten 69-76.

Manhwee Jo et al: "Implementation of floating-point operations for 3D graphics on a coarse-grained reconfigurable architecture" SOC Conference, 2007 IEEE International, IEEE, Piscataway, NJ, USA, Sep. 26, 2007, Seiten 127-130.

Mirsky E. et al., "Matrix: A Reconfigurable Computing Architecture with Configurable Instruction Distribution and Deployable Resources", 1996, IEEE, pp. 157-166.

Shirazi et al., "Quantitative analysis of floating point arithmetic on FPGA based custom computing machines," IEEE Symposium on FPGAs for Custom Computing Machines, I EEE Computer Society Press, Apr. 19-21, 1995, pp. 155-162.

Vermeulen et al., Silicon Debug of a Co-Processor Array for Video Applications, 2000, IEEExplore, 0-7695-0786-7/00, pp. 47-52, [retrieved on Feb. 1, 2015], retrieved from URL http://ieeexplore.ieee.org/stamp/stamp.jsp?tp=&arnumber=889558&tag=1>.

* cited by examiner

DATA PROCESSOR CHIP WITH FLEXIBLE BUS SYSTEM

This application is a continuation of and claims priority to U.S. patent application Ser. No. 13/903,470, filed May 28, 2013, which is a continuation of and claims priority to U.S. patent application Ser. No. 13/289,296, filed Nov. 4, 2011, (now U.S. Pat. No. 8,471,493), which is a continuation of and claims priority to U.S. patent application Ser. No. 12/371,040, filed on Feb. 13, 2009 now U.S. Pat. No. 8,058,899, which is a continuation of and claims priority to U.S. patent application Ser. No. 10/398,546, filed Jan. 20, 2004 (now U.S. Pat. No. 7,595,659), which is the National Stage of International Patent Application Serial No. PCT/EP01/11593, filed on Oct. 8, 2001, the entire contents of each of which are expressly incorporated herein by reference.

FIELD OF THE INVENTION

The present invention relates to logic cell arrays.

BACKGROUND INFORMATION

Logic cell arrays, such as, for example, reconfigurable logic cell arrays include, as particular types, systolic arrays, neuronal networks, multi-processor systems, processors having a number of arithmetic-logic units, and/or logic cells and/or communicative/peripheral cells (I/O), networking and/or network chips, such as crossbar switches, as well as FPGA, DPGA, Xputer, Chameleon chips, etc. The following patents commonly assigned to the assignee of the present application describe logic cell arrays and are incorporated by reference in their entirety: German Patent No. 44 16 881; German Patent No. 197 81 412; German Patent No. 197 81 483; German Patent No. 196 54 846, German Patent No. 196 54 593; German Patent No. 197 04 044; German Patent No. 198 80 129, German Patent No. 198 61 088, German Patent No. 199 80 312; International Patent Application No. PCT/DB 00/01869; German Patent No. 100 36 627, German Patent No. 100 28 397, German Patent No. 101 10 530, German Patent No. 101 11 014, International Patent Application No. PCT/EP 00/10516, and European Patent No. 01 102 674. According to their wide variety, logic cells are herein defined as any cells that contain logic, arithmetic, switches, memory, or peripherals.

In systems such as those previously cited, there are approaches that enable in efficient processing of data which may be implemented in hardware architectures. There nevertheless exists in practical implementations the need to optimize designs, which, in particular, can be structured in a space-saving manner on a wafer and/or can be operated in an energy-saving manner. Additionally, it is desirable to find especially advantageous kinds of operation. One of the difficulties with conventional systems is that a large number of cells have to communicate with each other. The communication may be required in order to pass the data to be processed from one cell to another. This is the case, for example, if a cell is supposed to further process the results from another cell, e.g., by linking of the result obtained there to results obtained from one or more other cells. Furthermore, communication may be required to transmit status signals.

Busses for transmitting signals to one of a number of possible receivers have been used in this context. Busses are bundles of wires, the number of wires typically being determined from the number of bits to be transmitted together, that is, typically in parallel, plus in some cases a series of status lines.

With conventional simple busses, as are used, for example, in PC's for the communication of plug-in boards with the CPU and/or with each other, the bus lines may be routed to all receivers, and then appropriate control signals transmitted along with them, that is, addressing, ensures that only those receivers respond that are supposed to receive the data. Such a system becomes problematic when a great many communicating units need access to the bus or busses. This is because the communication of data must wait, if necessary, until the bus has been released by other units and/or time-slice solutions must be implemented that grant a transmitting unit only a certain transmission time, which as a rule is independent of whether all data has been transmitted in this time, which might also make it necessary to use a number of time slices for the data transmission. For example, this approach is practiced in systems like the token ring network. In systems like logic cell arrays, in which very rapid communication is desired in order to ensure high data processing speeds, this is an undesirable solution.

It has also been proposed that the busses be segmented. If, for example, in a series of logic cells several units to be connected to each other are disposed close together in pairs, a bus line that passes along all units and consequently is long may be separated by means of switches in order to form several subbus systems. In this context, each segment, like the entire bus, comprises the required number of parallel data lines and the additionally required protocol lines; the communication of a pair of logic cells that are disposed close together does not disrupt the communication of another pair that are disposed close together. In this way, the data rate that is transmitted via the bus system may be substantially increased.

However, this system may not work well when integrated on semiconductor chips, such as in CMOS technology, where the structure is typically complex and the operation is energy inefficient.

SUMMARY

According to example embodiments of the present invention, in a logic cell array having a number of logic cells and a segmented bus system for logic cell communication, the bus system includes different segment lines having shorter and longer segments for connecting two points in order to be able to minimize the number of bus elements traversed between separate communication start and end points.

By configuring the busses using segments of great length that are fashioned as a single line for bypassing long paths in a logic cell array, an especially simple design and an especially efficient operation result. By simultaneously providing short segment lines, it is ensured that all points are addressable as needed.

Each of the segment lines may be formed of a plurality of parallel lines whose number is determined by the bus width and/or the bus protocol. Each segment is therefore formed by a bundle of parallel lines. All lines of a segment may have the same length, so that the lines of a line bundle may all be routed to one and the same end point line, such as a data input of a logic cell, where they may be connected to the input members that are assigned to each of their bits.

According to one example embodiment, data conversion logic cells like arithmetic units have three of the line bundles that are required for the processed bit width to be supplied to them as data supply lines. This permits carrying out a linking of operands A, B, C of the A×B+C type within the cell. This operation is of particular significance in the field of digital signal processing, and the bus structure is therefore especially suitable for logic cell arrays for the construction of real-time configurable DSP arrays.

According to another example embodiment, a logic cell array can perform arithmetically multiplicative linking of operands if at least two of the line bundles for data for the bit width being processed are led out from the cells, in particular with one line bundle for high-order bits and one line bundle for low-order bits. In this way, for a data word width of 32 bits, a 64-bit-wide output is created in order to output the result of a multiplication in full width.

In reconfigurable logic cells, control inputs may be addressable in particular via the segmentable bus system and are disposed in such a manner that at least the logic cell's sequence control signals, such as the signals Reset, Step, Stop, Go and Reload, are transferable into the cell. These trigger and/or enable a reset, a reconfiguration and an activation, respectively. For this purpose a corresponding number of bit lines may be provided. In one embodiment, at least two bit-wide data lines are therefore provided for control signal inputs. Each of the control signals may have a separate signal input assigned to it. Alternatively, an input linking circuit on a several-bit-wide status line may provide for an orderly addressing of the cell. These signal inputs are control signal inputs that can carry the signals that control configuration and/or reconfiguration (flow control signals), such as trigger signals. The actual communication of the cell with the unit or a reconfiguring unit, such as a configuration manager (CT or CM) may thus be achieved by techniques, for example, via the so-called ready/ack/rej protocol, which permits a reconfiguration of the cell only under certain conditions. For the details of this protocol, reference is made to the above-listed patents and additional publicly accessible documents about XPP/VPU architecture.

In the case of rebooting. The bus structure may be designed for this accordingly.

Furthermore, the bus system may be routed to I/O interfaces and/or to external data memories. In other words, the segmentation structure may be used to advantage both inside and outside the logic cell field. I/O interfaces transmit from bus systems that are inside chips to the outside. In this context any bus systems, in some cases alternating in time, are connected for external output and/or input. In addition, the possibility may exist of combining several bus systems in such a manner that they are synchronized with each other. For example, any two output bus systems or an input bus and an output bus together may be synchronized.

In an example embodiment of the bus system, a series of interline elements is provided. Here "line" indicates in particular a first-class conductor, such as a continuous metal line within a semiconductor wafer. "Interline elements" indicate those elements that are disposed between any two lines that are assigned to each other. Interline elements may be connecting switches, in particular the control arrangements that respond to the requirements of logic cells and/or the communication thereof and/or other units; thus, the switch may, for example, open or close at the request of a configuration manager, that is, a unit that configures the logic cell field. This makes it possible to use a compiler to establish how the bus structure is to be designed. In particular the compiler or another configuring or controlling unit is able to determine whether the communication between two cells that are separated is to be accomplished via segment lines having shorter or longer segments, and moreover, if there are a number of longer segments, a preference may also be specified through which one of a multiplicity of segment lines the communication is to occur. In this way, the power loss through the switch may be minimized and/or an optimal adaptation of the data conversion and/or processing to signal propagation times may be provided along the bus lines.

The interline elements may additionally or alternatively include multiplexers in order to feed a signal from a line to one of a series of destinations, such as logic cells, and/or lines that continue further and feed the signal to a multiplicity of destinations, in particular selectable destinations, simultaneously.

Furthermore, registers may be provided as interline elements. These perform different tasks. In this manner data may at first be kept on the bus until a destination is ready to retrieve them. Furthermore, when busses are very long, data processing can be prevented from being properly completed if the long periods of time until the data arrive at the destination when paths are long and (in some cases) the return of the reception confirmation is taken into account. Buffering the data in registers increases the total amount of time (delay) until a data packet traverses the bus, but the interim time until arrival of the data (latency) in which the array or individual cells may not be used meaningfully is reduced. A tradeoff between latency and delay may be required, in which the register is switched in, for example, only under predetermined and/or established conditions, such as very long bus paths. It may then be advantageous if the switching on of the register is controlled, e.g., by a control unit or similar item, like a configuration manager, which in turn is able to operate in response to compiler-generated commands. Furthermore, it may be advantageous to provide a register in order to ensure a synchronous arrival of bits of different significance at a destination point. If busses are fed back, that is, a connection is provided from a cell output to the input of the same cell, registers may be used in such high-frequency feedback loops, to prevent damage to components by the register-imposed delay time.

In a particular implementation, registers may be designed all or in part as additive and/or multiplicative registers; specific links may be implemented without problem and with little circuitry effort, and, thus, the logic cell structure may be relieved on a net basis via shifting of simple linking tasks. In particular, a register may be designed precisely for the purpose of linking two operands algebraically; in busses for transmitting status signals that indicate the status of a logic cell or a series of logic cells and/or trigger a change thereof, that is, in busses for so-called trigger vectors, the registers may preferably be designed to implement Boolean links and/or lookup tables, such as modifiable lookup tables.

Line drivers can also be provided as interline elements.

This may be necessary in particular for multiplex systems that provide a very strong signal fanout.

In another example embodiment of the present invention, it is possible to provide a change from one segment line having longer segments to a segment line having shorter segments and/or vice-versa along a data transmission path. This permits the provision of roughly equal signal propagation times for the communication of a larger number of cells in the same direction, that is, along the same bus structure, via an appropriate combination of short and long segments, even if buffer registers are provided. The bus structure in this context is comparable to a street that has fast lanes and crawler lanes and enables a lane change at predetermined intermediate positions.

In yet another example embodiment, the bus system may include a multiplicity of parallel segment lines in which several parallel segment lines are provided with longer segments. The longer segments of the segment lines that have longer segments do not all need to be of the same length; a staggered arrangement may be provided.

When there is a greater number of parallel segment lines, the segment line ends and/or interline elements may be disposed within the segment lines at an offset in relation to each other in the bus direction. Typically, interline elements, such as, switches, registers, multiplexers and drivers are provided at the segment line ends or leads. The hardware technology implementation of these elements then requires substantial space, which may be considerable compared to that of the lines to be disposed in the intermediate layers. The offset disposition of these elements then ensures that space has to be provided only for interline element arrays of, for example, two or three segment lines, but not for interline element dispositions of all available segment lines. Also it is possible not to provide drivers or registers for all interline element dispositions, but only to provide them every nth segment end. However, in this case, it is advantageous that at least three segment lines that have longer segments for at least two segment lines have segment line switching circuits, in particular multiplexers provided at predetermined positions as interline elements. In this way, the desired segment change may be configured as required. Segment changes occur at crossings and are possible among segment pairs or segment groups that vary along the bus. It is then possible that the segment line switching circuits for the change from a first to a second segment line are provided at a first position and the segment line switching circuits for the switch from a second to a third segment line at a second position.

In addition to switching by pairs, it is also possible to select, at a position or a multiplicity of positions, among several segment lines to switch to and/or to which data are simultaneously output.

In an additional aspect of the present invention, two-way communication of the cells is possible for the logic cell array. In bus systems having interline elements, such as drivers and/or registers, directions of travel are defined. In order to enable the communication of the cells in two directions, separate bus systems are provided for opposite running directions. At least in one direction, it is once again possible to provide at least two different segment lines with shorter and longer segments, in particular ones that are once again generally parallel.

If the segment lines are separate for the two directions of travel, a register may be provided for at least one direction of travel. As explained above, the register may be provided in the bus system that is routed in the reverse direction, i.e., to that bus system, with which signals may be routed back from an element output to an element input.

According to another aspect of the present invention, a first bus system may be provided for the transmission of data to be processed and a second bus system may be provided for the transmission of status and/or monitoring or control information. One or both bus systems may be formed with segment lines having short and long segments, and the respective bus systems or bus arrays may be configurable separately from each other, or definable in their circuitry and/or regarding the operations in linking registers or the output of lookup tables.

The bus system may be used in a logic cell array in which a plurality of logic cells are arranged adjacent to each other in a row. The longer segments then bypass at least one logic cell. If the logic cell array includes even more logic cells in a row, the longest segments may bypass more than one logic cell.

It should be pointed out that, in at least two-dimensional logic fields having a disposition of logic cells in rows and columns, a segmented bus system may be provided in each row and each column and have the previously described structure having long and short segments in parallel segment lines.

The described bus structure may be advantageous in arrays in which data processing units, such as logic units, are to be linked to each other. However, special advantages are offered if the logic cells are selected from, include and/or form arithmetic-logic units, DPGA's, Kress arrays, systolic processors and RAW machines, digital signal processors (DSP's) that have more than one arithmetic-logic unit, configurable (programmable) logic cells or other cores and/or PAE's, ALU, input/output (I/O) functions and/or memory management units (I/O) and memories. A successful implementation of a bus structure having segment lines that have short and long segments is the VPU/XPP processor unit produced by the applicant.

Such a processor may have a multiplicity of different communicating logic units disposed in an array, the logic units having at least memory storage and data conversion units and the memory units being disposed close to the edge of the array. This makes it possible to have data run through the array and be buffered, if necessary, at the edge in order to bring about reconfiguration as required. The flow may also occur via parallel rows or columns and/or in a meandering way, in order to thereby provide increased computing power.

Additionally, input/output units may be disposed closer to the edge than the storage units. This allows the buffering of data before processing by passing through the array. However, in any case communication of the logic units, at least from edge to edge, for at least one bus system to be provided that is, in particular, segmentable as previously described. Then, data read from a first memory that is close to the edge may be changed as required in a first data conversion unit that is close to this edge, and transferred from there into at least one other data conversion unit in order to carry out further data modifications as required. The data, after flowing through a plurality of data conversion units into a second memory close to the edge may be stored at a position distant from the first memory, and then a reconfiguration of the data conversion units may be carried out for the re-determination of the data conversion, and the data may be routed through at least one part of the data conversion units, possibly in the opposite direction of travel. It may also be provided that the outgoing run is made in a row and the return run in that row or a row situated beneath it in order to take into consideration pipeline effects.

The processor may have at least one programmable gate array (PGA) and several data modification units having ALU's. At least one PGA may be surrounded by other data conversion units, in particular ALU's, in order to be able to obtain data easily for linking purposes and/or output them.

It is possible that, in an array made up of reconfigurable units, several (sub-) arrays, particularly identical ones, are provided that may be brought into communication with each other. For this purpose, each may include a reconfiguration unit that may be designed for reconfiguration of the reconfigurable element of the array. Running inside the array are the bus structures appropriately described above. A configuration manager, which may in particular be disposed on an array side on which no memory units and/or I/O units are provided is thus assigned to each array, the reconfiguration unit may extend over the breadth of the array, which offers the advantage that an optimal chip form may be produced.

A supervising configuration manager which is common to the arrays and which extends in particular over the breadth of more than one array and which is designed for communication with at least several or all of the supervising configuration managers, may also be provided.

Alternatively or additionally, given such a processor having arrays that may be brought into communication with each other, in particular identical ones that have reconfigurable data conversion units, it is possible for the arrays to have switching units (VPAE's) between them that are disposed among the fields for communication switching.

Using such switching units (VPAE's), data and/or control signals (monitoring signals, trigger vectors, etc.) may be transmitted.

The configuration units of at least two of the arrays may be in direct connection with each other. As a result, a supervising configuration unit may be omitted and/or a fault tolerance may be increased. For this purpose, the communication of the configuration units of the at least two arrays that are in direct connection with each other is determined via dedicated fixed lines and/or data lines that are pre-configured, that is, established during bootup.

The switching units (VPAE's) may include two configuration registers, the first configuration register being addressable by the first array and the second configuration register being addressable by the second array. Only if access to the switching units has been permitted for both arrays, is data transmitted accordingly. For this purpose, the first array may permit the insertion of data in the switching unit by appropriate configuration of the first configuration register and signal the insertion of the data to the other configuration units via the dedicated line. Afterwards, the data is retrievable, which is ascertainable by configuration of the second configuration register. A sluice-like transmission of data is enabled by the VPAE's. The separation of a larger array into sub-arrays in other respects generally allows the reduction of the configuration effort to be handled by a configuration unit and as a result may contribute to an efficient array operation that is not impaired by a bottleneck imposed by a configuration unit.

The sub-arrays may be brought into communication with each other via multiple data conversion and/or transfer units (VPAE's) so that no data rate limitation is produced in the data processing.

The geometric hardware may be configured such that the communication-enabling data conversion units are connectable on both sides via busses running along the array, the busses being designed in particular to run past the array edge and there in particular may be routed further to I/O interface units.

As explained above, the processor may include one or more data relaying rule implementation arrangements, in particular a lookup table that are designed to enable relaying of data and in particular data conversion in response to the joint fulfillment of a multiplicity of criteria, in particular event-related criteria. The data to be relayed may in particular be data or trigger vectors that are involved in the reconfiguration and/or reconfigurability of logic cells. The function or the conversion of the relevant data relaying rule implementation arrangement is configured accordingly.

The processor may also be configured using segmented bus structures so that data conversion units and data storage means are provided, at least a few of the data conversion units being locally assigned data storage arrangement and in particular, an arrangement being provided to locally read out data that is locally written into the local data storage arrangement for the further local recent data modification. In other words, interim results may be stored in a logic cell and be further processed along with other data and/or using other links.

If there is a reconfiguration of a cell array made up of logic cells that are reconfigurable while in operation, which allows in particular a reconfiguration in response to the propagation of specific pre-determined data, then one may select whether the reconfiguration occurs in response to the data propagation for all logic cells into which the data that was pre-specified and/or derived therefrom flow and/or only for a part, in particular a processing branch (e.g., an if/then branch), while at least one other branch remains unchanged, which reduces the reconfiguration effort and/or only a sub-chain of a longer row of logic cells, in particular, sequential data-processing ones, is reconfigured, such as up to a predetermined logic cell, and/or in order to permit the reconfiguration immediately or after that data processing or further data processing. This substantially increases the practical use of the wave reconfiguration. It should be mentioned that such a selective wave reconfiguration is possible using only a few commands, in particular, for example, the commands Reset, Step, Stop, Go and Reload.

Consequently, the number of trigger inputs or control inputs that are routed to a reconfigurable logic cell, such as a PAE, is small.

The manner in which a logic cell reacts to a specific characteristic data packet in wave reconfiguration is capable of being pre-loadable. This may happen in particular by pre-loading the lookup tables that are provided in the busses. The busses in this context may in part be routed via logic cells and/or formed by and/or with them.

It is possible without any other measures to use the processor array having the bus system of the present invention in order to approximate the behavior of non-linear systems quickly and simply in calculations. This may happen by approximations being determined for one row of working ranges that are adjacent to each other at one temporary working range (n) and at the working ranges that border it below and above ((n−1), (n+1)), the parameters that enable the approximations are pre-loaded, the behavior with the central (n) working range is approximated until that working range is exceeded inside of which the approximation is suitable, then that approximation (n−1) is used for further work which belongs to the working range into which the exceeding proceeded, and the approximation at that working range (n+1) into which the exceeding did not proceed is overwritten using an approximation (n−2) that, together with the previously used approximation (n), encompasses the currently used approximation (n−1) or the accompanying working range. By overwriting that working range in which the operation value is not run, only three variants need to be pre-loaded in order to ensure a rapid further processing after the range is exceeded. Because the overwriting of the preloaded working range happens during the data processing, a constant data computation is possible during a steady transition of the operation values without greater leaps or abrupt changes. It is possible that this manner of approximation may not transferred to multidimensional cases due to operation value encompassing in more than one direction and corresponding overwriting of the intervals that no longer adjoin the current operation value interval after the overwriting of an n-dimensional operation value interval.

DETAILED DESCRIPTION

Figure 1:
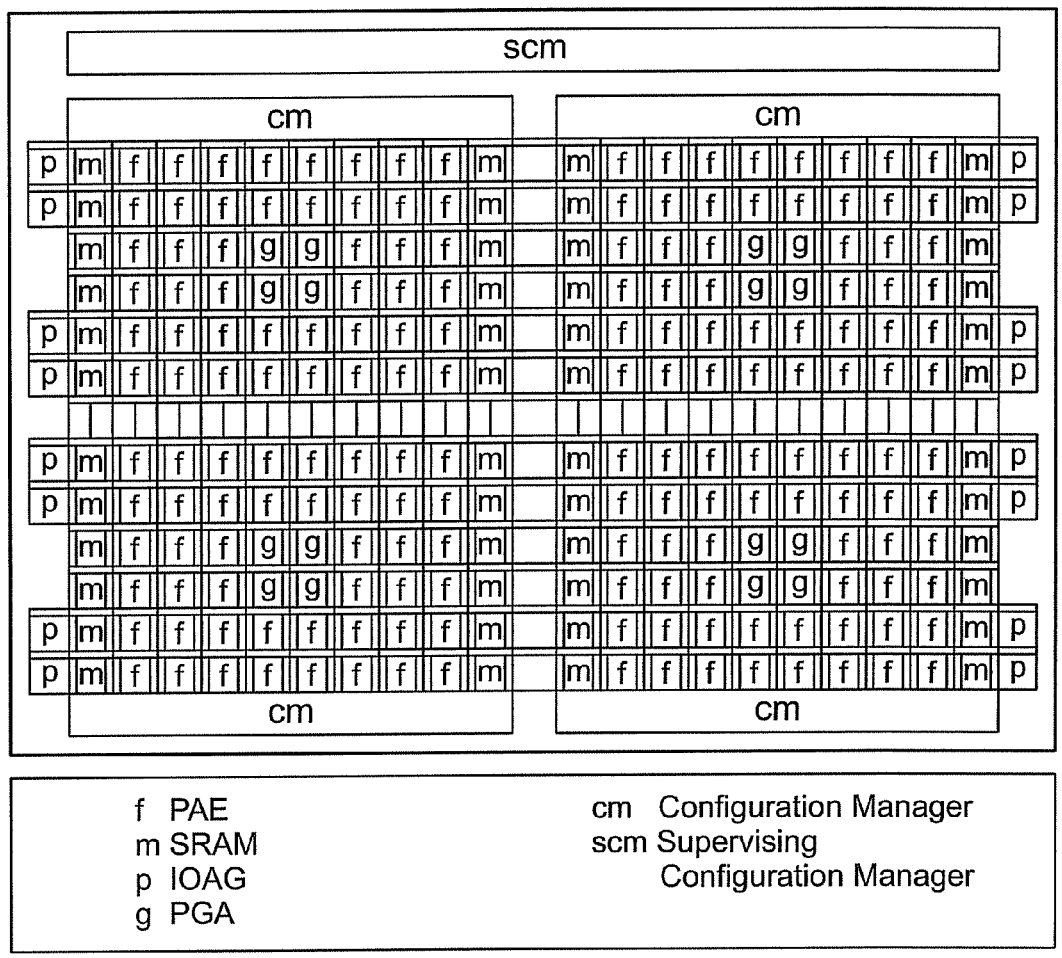
FIG. 1 shows a logic cell array configured in accordance with an example embodiment of the present invention.
Figure 2:
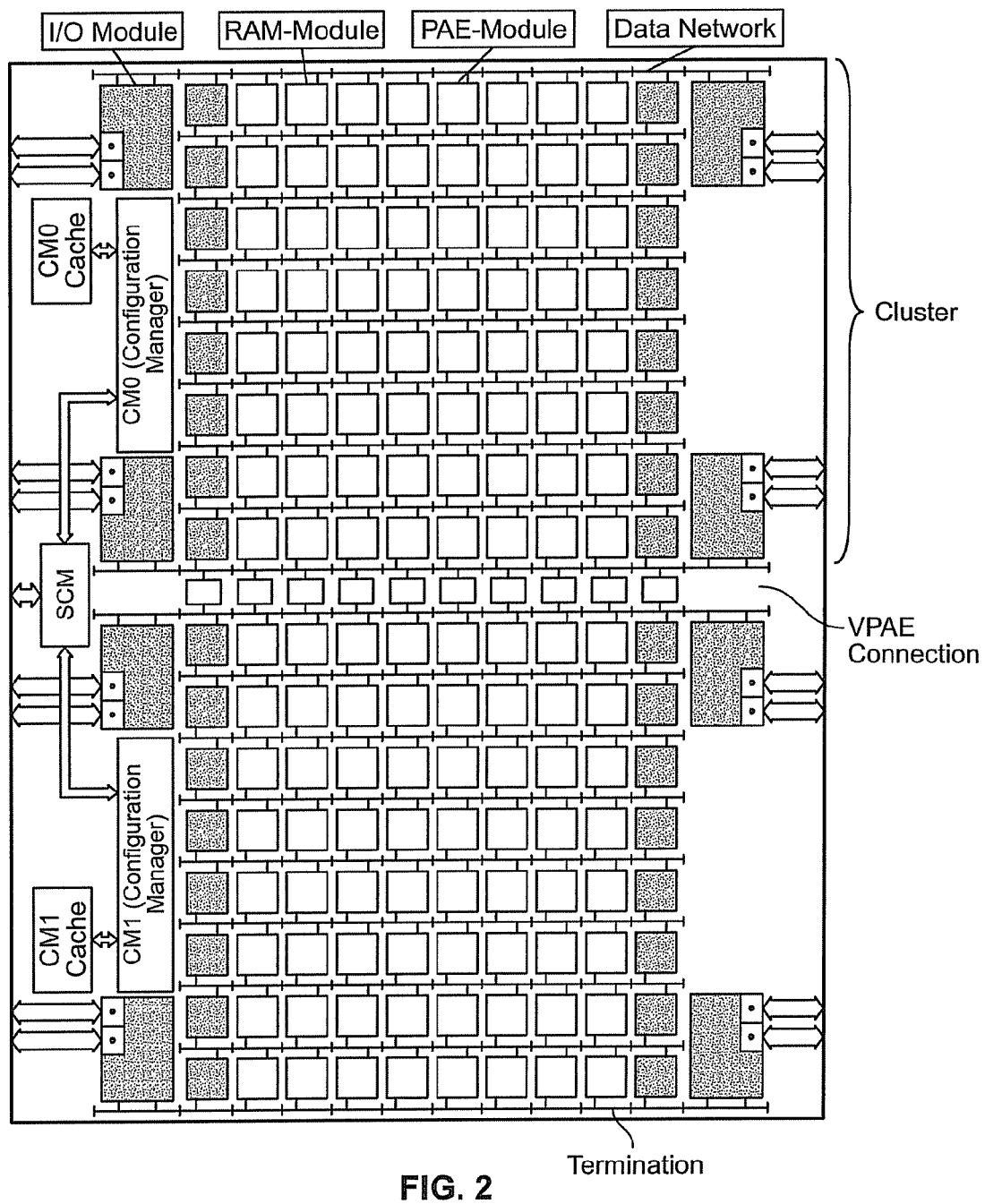
FIG. 2 shows a detailed view of the logic cell array having clusters.
Figure 3:
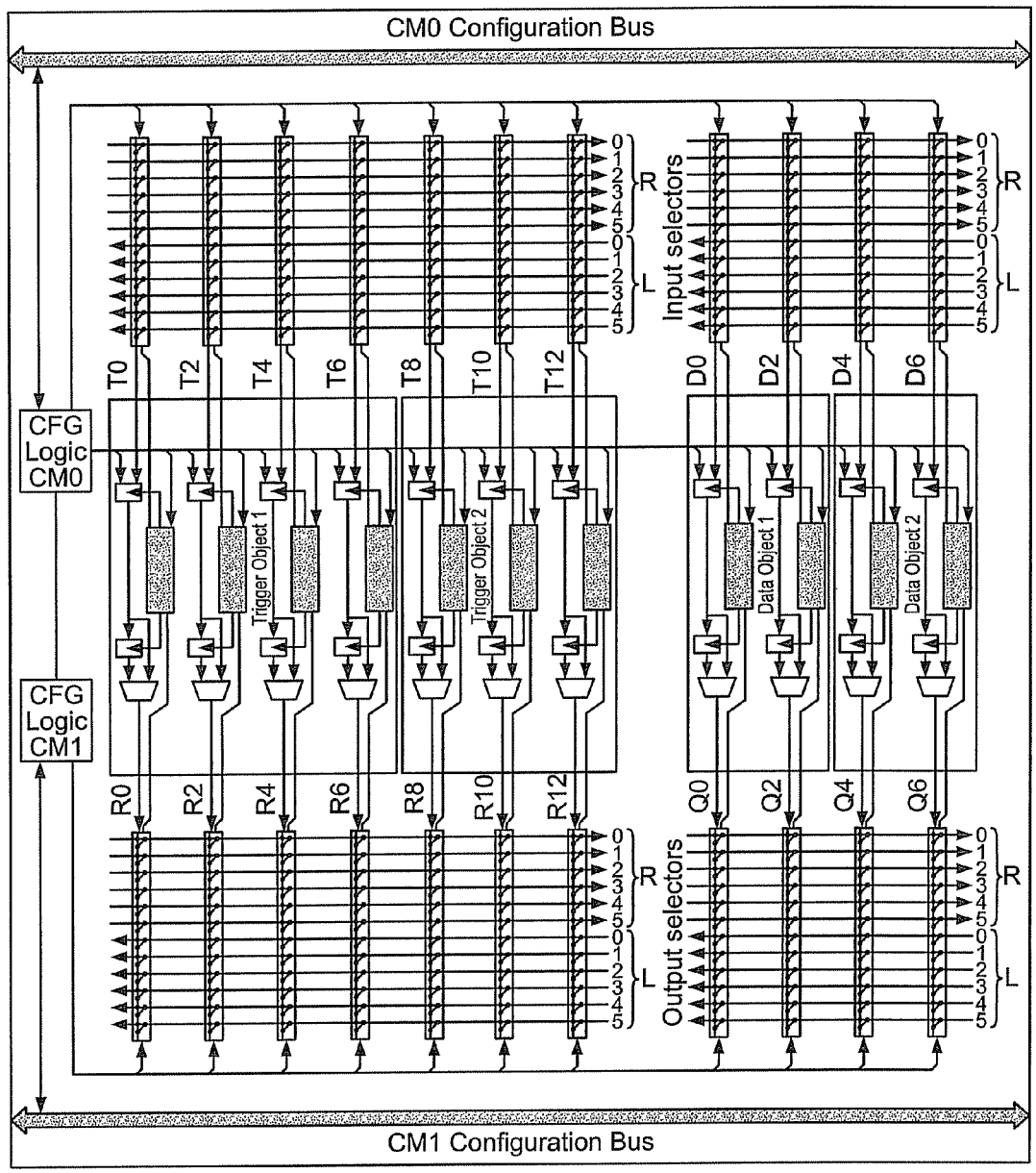
FIG. 3 shows an example for a forward register of a configuration bus according to the present invention.
Figure 4:
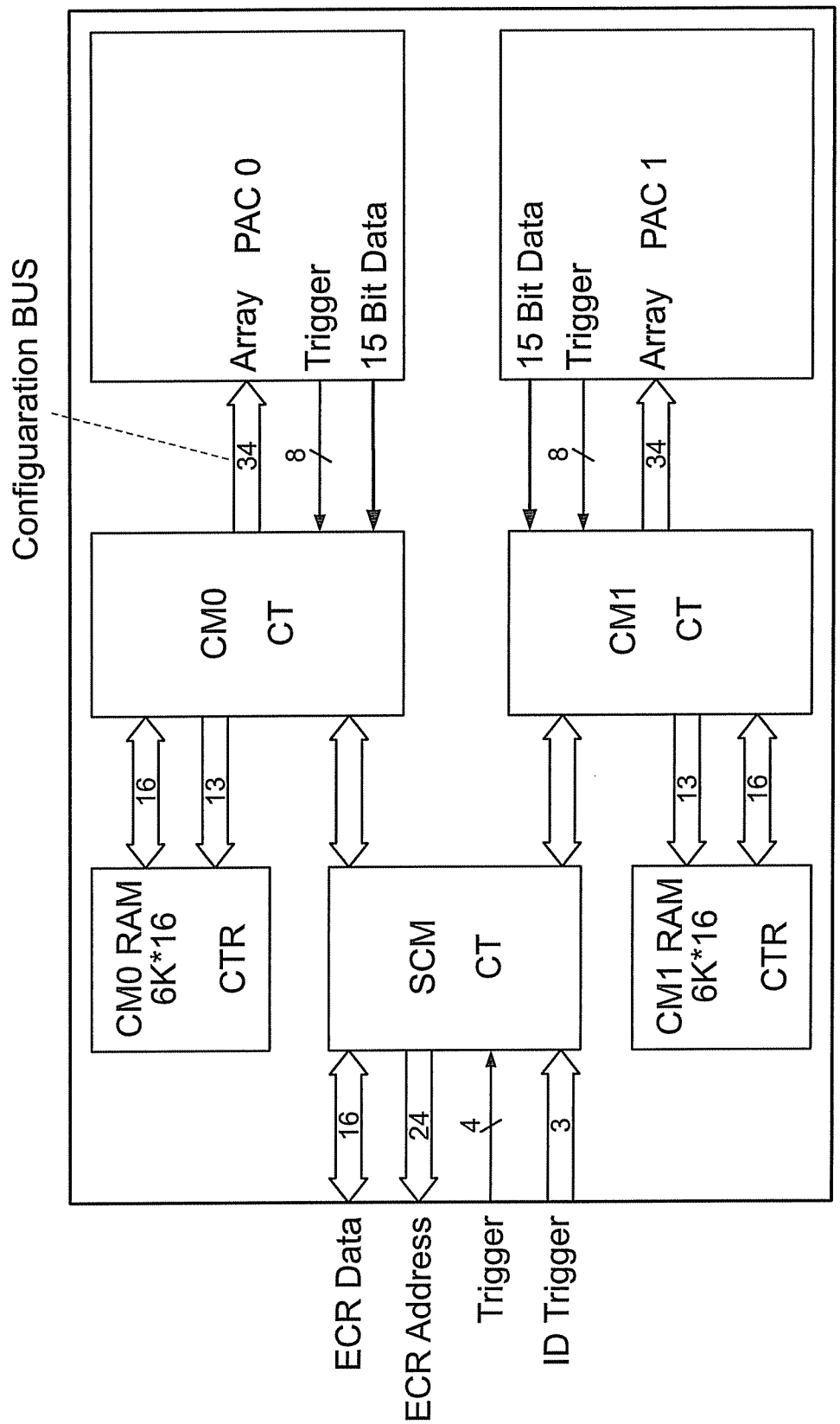
FIG. 4 shows an example embodiment of the hierarchy of configuration managers of a logic cell array according to the present invention.

According to FIG. 1, a processor 1, which may form a unit that may be characterized as an XPP (extreme processing platform), includes two fields or clusters including: a number of arithmetic logic cells (ALU-PAE's=arithmetic logic unit processing array element); memory cells (RAM-PAE's=Random Access Memory processing array element); several illustrated as four input/output cells (I/O elements, input/output processing array element); a bus system running through each field; and a configuration manager that is assigned to the field, these elements together as a cluster forming a unit, which by itself is capable of processing data and doing so as a reconfigurable unit and a higher-order configuration manager being assigned to the two configuration managers (CM) of the cluster in order to form thereby a master cluster or the XPP. It is possible using tree-like hierarchical structures to have more than two fields of processor elements cooperate. In this manner, a higher-order configuration may be placed over more than two configuration managers (CM), which on their part are each assigned to only one individual PAE cluster and/or it may be provided that a multistage configuration manager hierarchy is built up, in which a configuration manager central level is actually assigned to first configuration managers (CM) and in turn is placed under one or more hierarchical levels.

FIG. 1 thus depicts the arrangement of the cells to each other in a two-dimensional matrix and its relative size by way of approximation insofar as the individual cells are disposed very regularly and in particular the PAE's, that is, the memory storage and arithmetic logic cells have approximately the same size, which makes it possible to carry out a page addressing in the generally rectangular and/or regular cell structure having a roughly equal linking to the bus system. The depicted addressing in this context, however, is arbitrary regarding the disposition of memories and arithmetic units in relation to each other, insofar as other dispositions, also involving the I/O cells and/or using still other elements, are possible and are adaptable to a desired special computing task without any further measures. The illustration that is shown is also exemplary in that a three-dimensional disposition of individual cells within the space is also possible, provided that the manufacturing technology of the semiconductor technology that is used permits this.

An individual PAE includes a multiplicity of inputs and outputs. The individual PAE is provided, on the one hand, with data inputs and outputs (A,B,C) and, on the other hand, with control or monitoring inputs and outputs (U,V,W). As is evident from FIG. 1, the PAE's are disposed in horizontal rows, the cells being connected among themselves via a bus system. These horizontal bus systems are connected in the center of the field to the PAE's that are situated above and below them, and to be precise with them only above and below in the depicted example. Thus, the transfer of data and status signals (i.e., control signals) upward and downward is accomplished via the PAE's and, as illustrated in FIG. 1, involves a RAM-PAE or an ALU-PAE. Consequently, all types of PAE's may be connected in the same manner to the bus system and internally wired accordingly. It is also possible to configure the I/O cells for connection to bus lines that are situated one on top of the other, unlike what is depicted).

As a result, the PAE's are used for the relaying of data, that is, for data to be processed as well as control and monitoring data in the vertical direction. The PAE's in this context are configured in such a manner that this relaying may be carried out with or without data modification.

Figure 5:
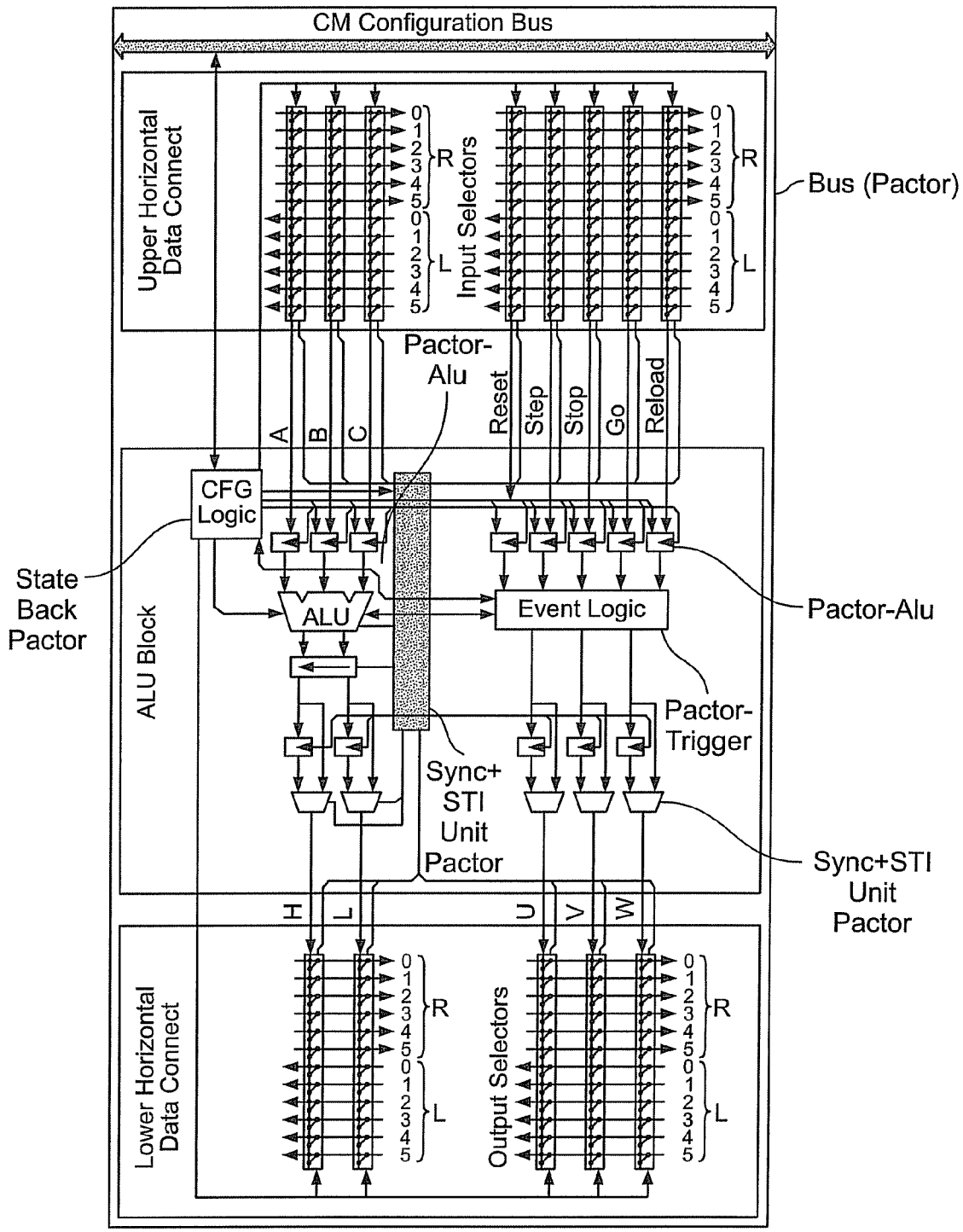
FIG. 5 shows details of a PAE including data according to an example embodiment of the present invention. The three data inputs A B C in the logic cell, the five trigger inputs for the trigger vectors Reset, Stop, Step, GO and Reload, the two data outputs H(igh) and L(ow) as well as the status signal outputs UVW and the bus coupling are depicted.
Figure 6A:
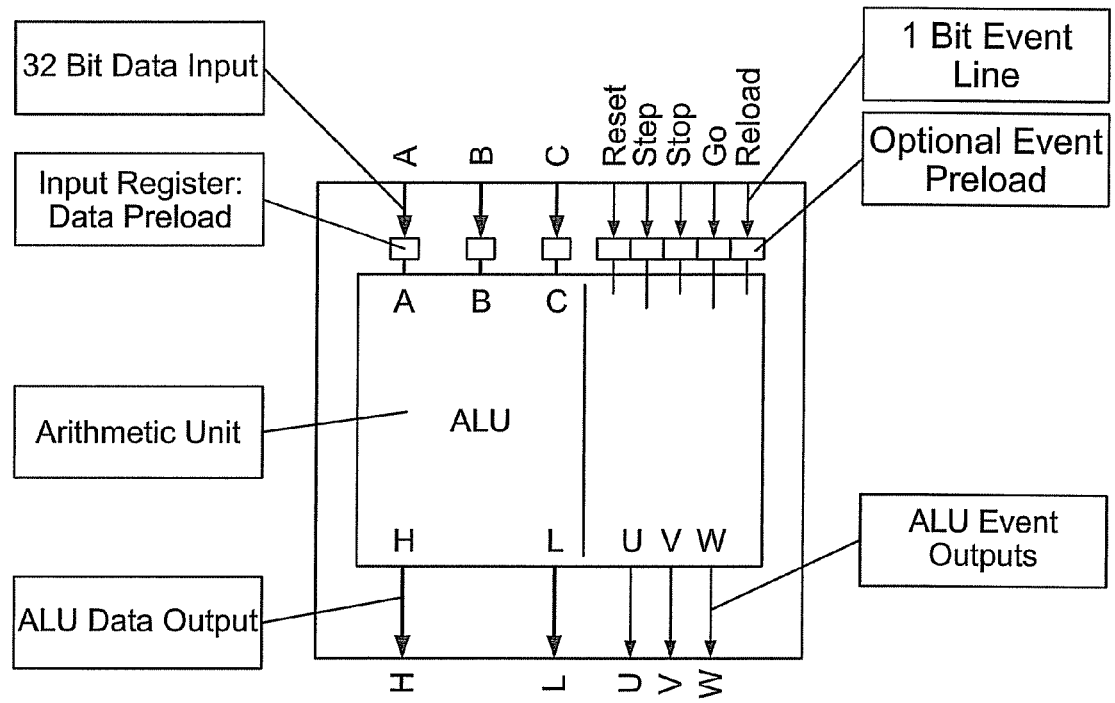
FIG. 6A shows the structure of the logic cell in the block diagram according to an example embodiment of the present invention.
Figure 6B:
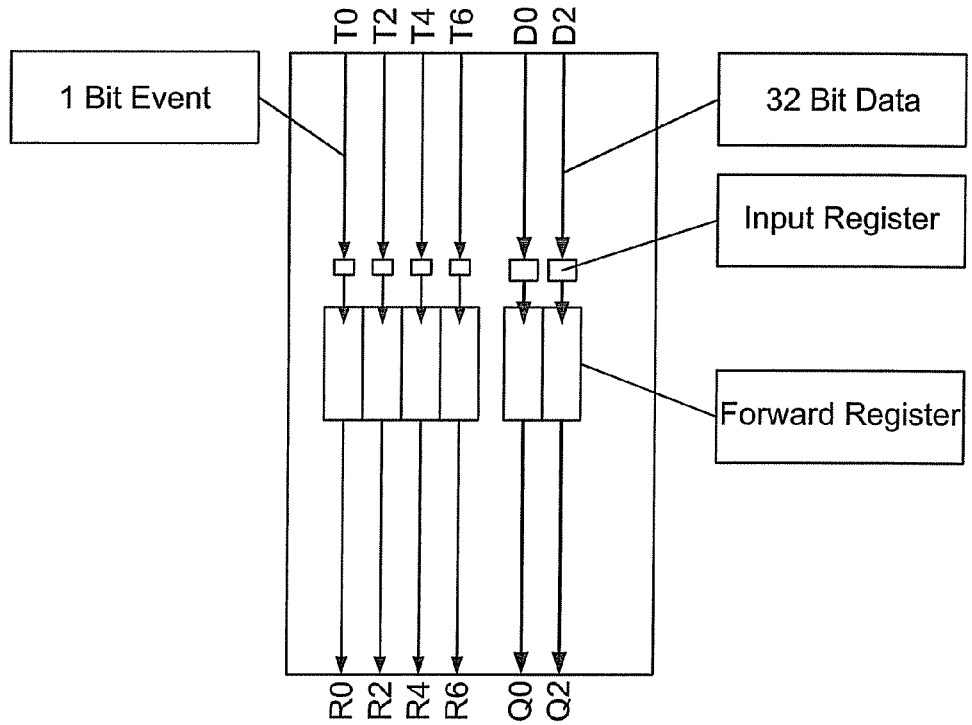
FIG. 6B shows the structure of a register according to an example embodiment of the present invention.
Figure 6C:
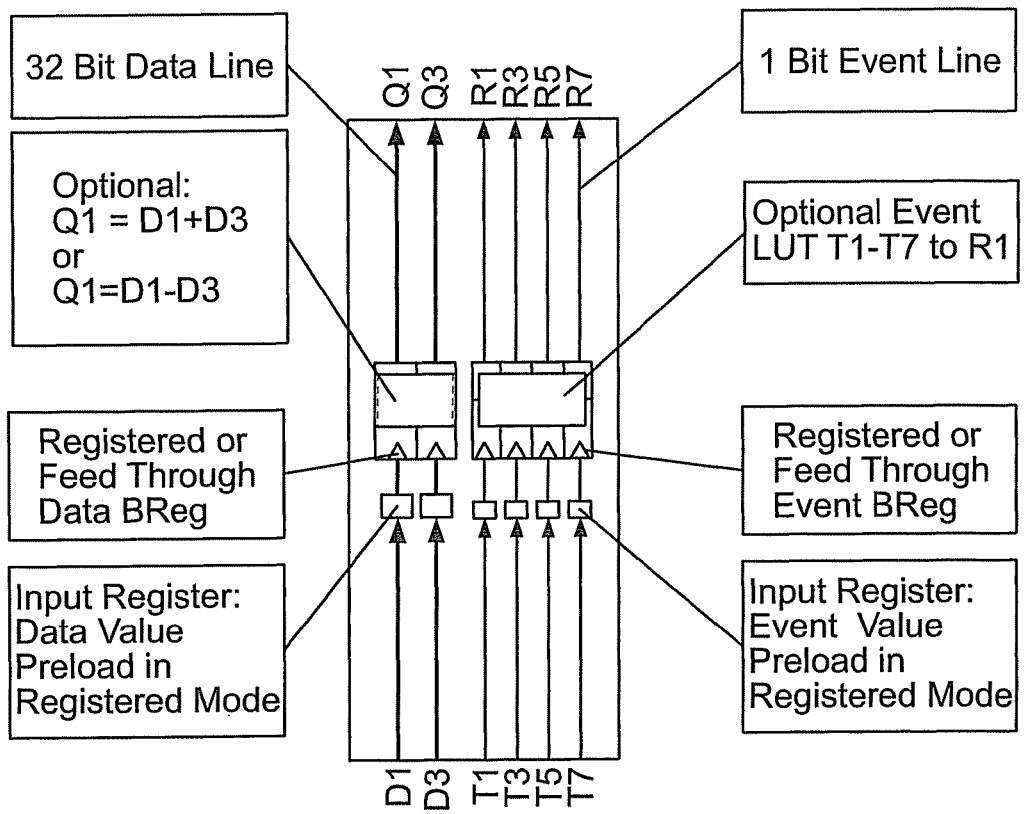
FIG. 6C shows the structure of a reverse register for event signals having the optional lookup tables according to an example embodiment of the present invention.
Figure 6D:
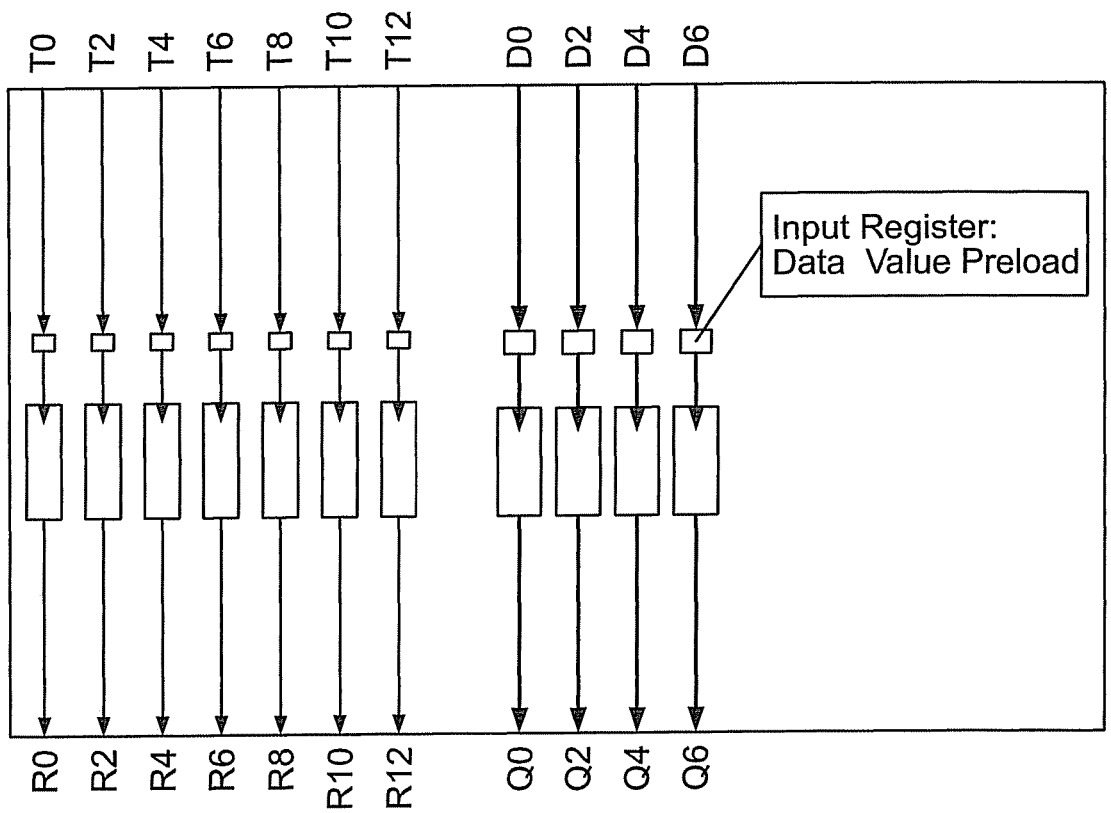
FIG. 6D shows a forward register having pre-loading capability according to an example embodiment of the present invention.
Figure 7:
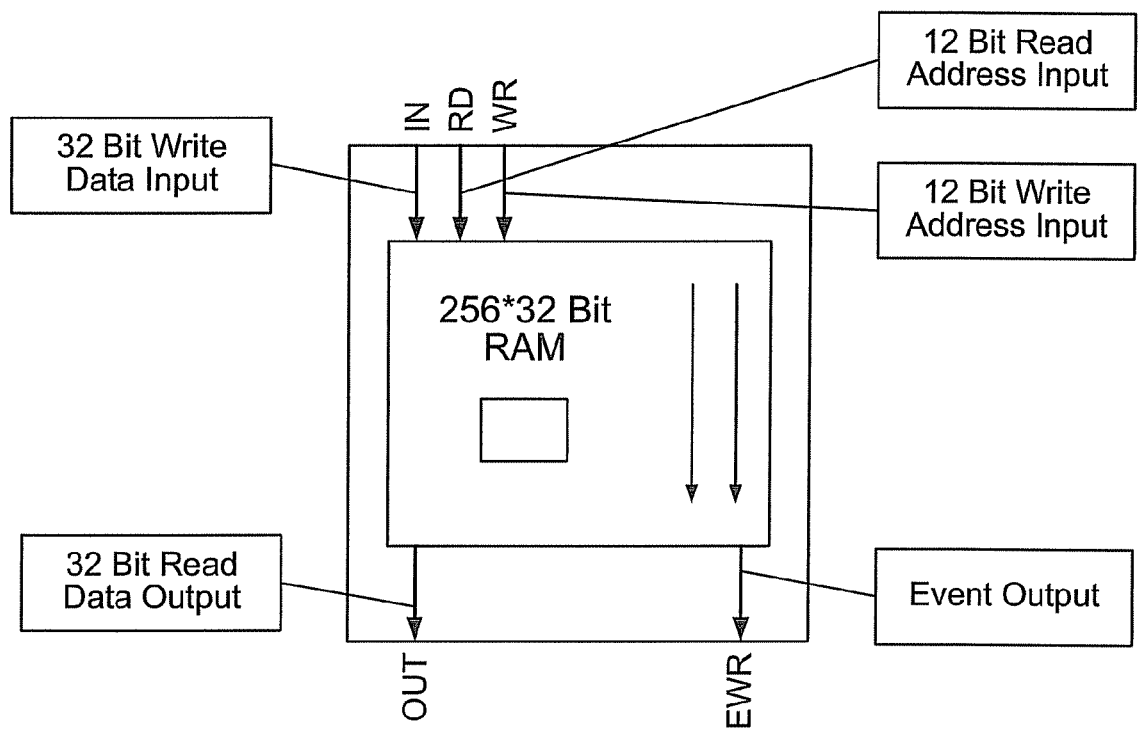
FIG. 7 shows a structure of a memory cell that has an input that is distinguishable from data conversion logic cells and has a correspondingly different required bus width according to an example embodiment of the present invention.
Figure 8:
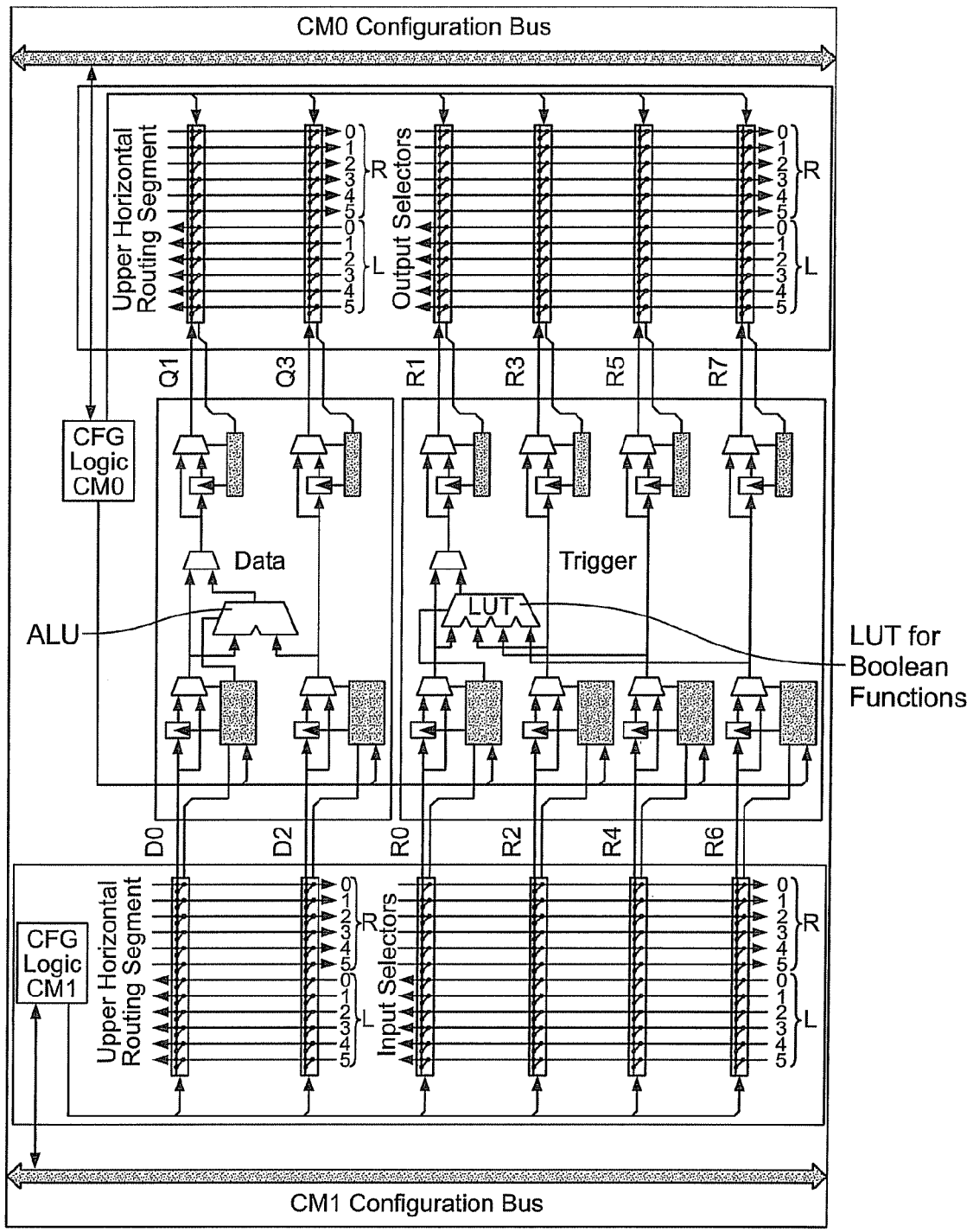
FIG. 8 shows another detailed view of a reverse register in the configuration bus having a lookup table for the implementation of Boolean links from trigger vector bits according to an example embodiment of the present invention.
Figure 9:
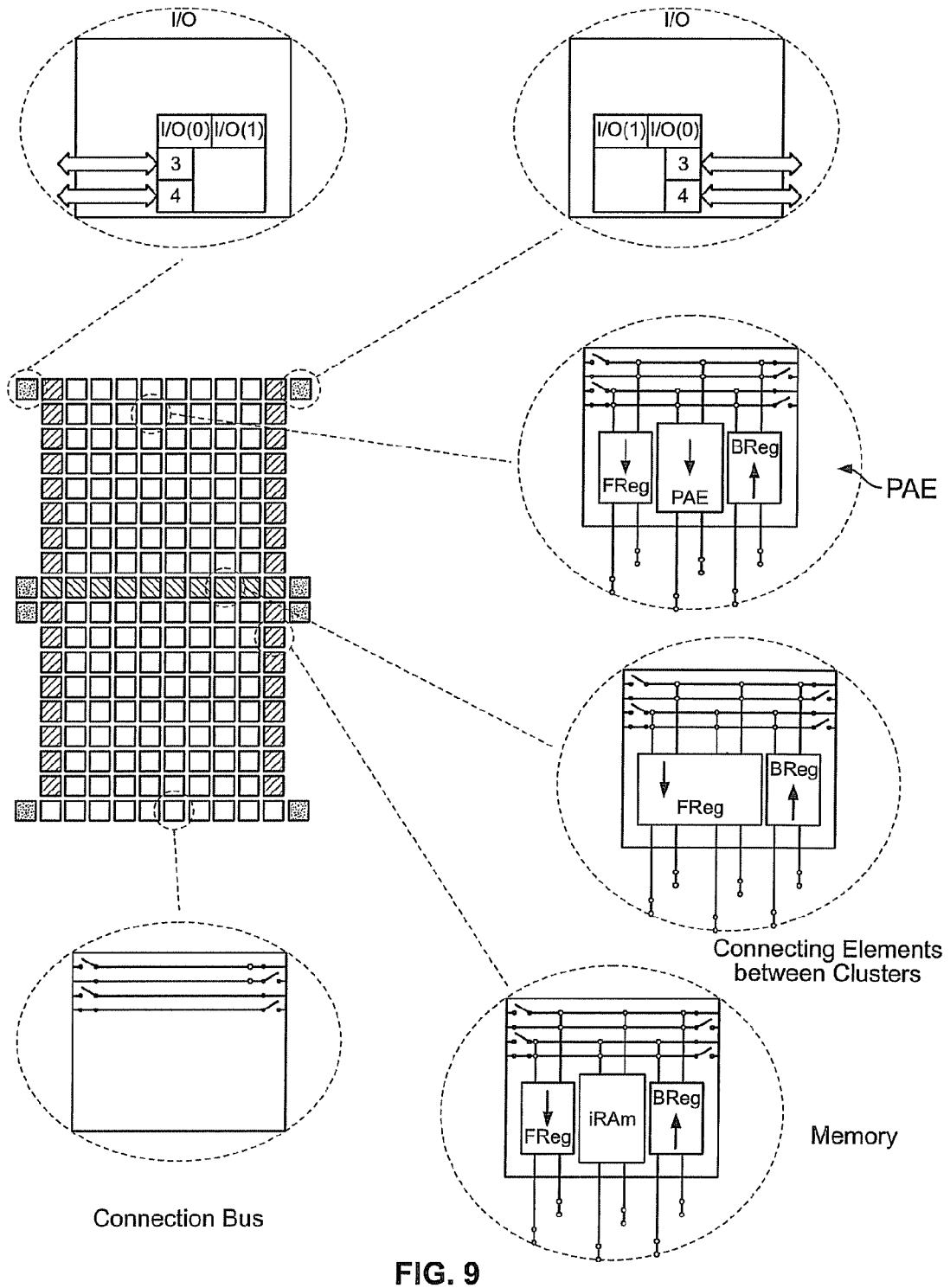
FIG. 9 shows additional processor details, in particular of the busses according to an example embodiment of the present invention.

The data modification may at first be accomplished in the actual functional unit of the PAE, e.g., if it is equipped as an arithmetic-logic unit and the data are linked in the arithmetic logic unit. In order to ensure that data may be supplied sufficiently rapidly to be linked in the cell and bring about an optimal utilization of the cell cycling, three lines A, B, C having the bit width that is able to be processed in the cell are routed to the cell as shown in FIG. 5. In this context, a particular additive input length is also possible that allows determining operations of the type (A+B)+C in a time-efficient and space-efficient manner using the cell results. If no data conversion is required, the data may be passed on to the functional unit. In this way, for example, data that are needed in a row further below are passed through into it without being subjected to a modification in the PAE. In the simultaneous routing of, for example, three data words corresponding to three inputs A, B, C, each may be relayed in different ways. Therefore, it is possible, for example, to relay only the data word to line C unconverted, while A and B are linked to each other in the ALU, for example, by A/B division. Alternatively, two data words may also be rerouted, while a data word in the ALU, for example, is linked to a constant or another value temporarily stored there. The convertibility to other data word amounts that are simultaneously routed to the PAE may also if desired be routed to the PAE as three data words; the individual word in this context has the processor-specific bit width, in the present case, for example, 32 bits.

Any inputs and/or outputs of PAE's may be configured using constants of the configuration unit (CT/CM). In this context, constants may remain unchanged during the entire operation of a configuration, or be overwritten during the operation, that is the execution of a configuration of new data of the configuration unit (CT/CM) and/or other sources, such as PAE's.

Instead of a linking of all or a part of the data as in the case involving PAE's having ALU's specifically in the RAM-PAE's, a complete or partial memorization and/or a complete or partial relaying may occur.

The relaying of the data, furthermore, may occur while bypassing the actual data conversion PAE core unit, like the ALU, in such a manner that a conversion of the data occurs before or during the relaying. This may occur by modifying the data while consulting the lookup tables and other linking units, for example, units that sort the relevant data words according to value. These units may be disposed between the bus coupling and the input into the PAE core unit and configurable in their function, whereupon whether the data are relayed unchanged or not is configurable. If they are not relayed unchanged, but rather changed, how the change occurs within the given possibilities is configured. For the status signal relaying in this context the provision of lookup tables is advantageous, because predetermined output signals may be generated with them in response to predetermined input signals without any additional measures.

Furthermore, the data relaying of unchanged data may be accomplished in a configurable manner immediately or delayed by register. The illustrated individual PAE for this purpose has a configurable, connectable forward register and a configurable, connectable reverse register for the data to be processed and a configurable, connectable forward register and a configurable, connectable reverse register for control data, that is, trigger vectors or status signal and/or control flow data. It is indicated that registers having increased (temporary memory) depth, in particular as FIFO registers, would be foreseeable, precisely in order to temporarily store data on a multi-cycle basis. Assigned to the register in question is a configurable multiplexer with which the register in question may be connected into the data path or removed from it, as desired. The multiplexers are also configurable such that results from the cell may be connected on the bus as desired and required. Therefore, for example, the top and bottom bit word that is obtained in a multiplication are output (H,L) and/or only a result data word (H) is output and a data word relayed and output on the bus, even a desired exchange (A{—}H) being configurable. Consequently, a PAE is characterized in the present processor model by a structure that has a central functionality lie an ALU, a RAM and/or, for example, also an FPGA and the additional data relaying functionality, possessing a forward and/or reverse register data relaying functionality comprised of three basic modules, such as FPGA, ALU, RAM and the two (forward/reverse) register data relaying functionality modules, the latter of these being able to implement additional functions. Central functionality in this context does not mean spatial central functionality, but rather functionality in the sense of assigning the central functionality and effect of the particular PAE. The additional functions, which are implemented via the register data relaying functionality modules, include in particular, in the forward register for the data flow, control operations like multiplexing or demultiplexing and copying and/or other manipulations of data. In the reverse register, an ALU functionality may be implemented for the data flow and/or a Boolean linking of event signals, i.e., trigger signals. Thus, the PAE is comprised of modules for the manipulation of data streams, for the operative linking and/or generation of data packets and the processing for the most part via logic linking and generation of event packets.

Figure 10:
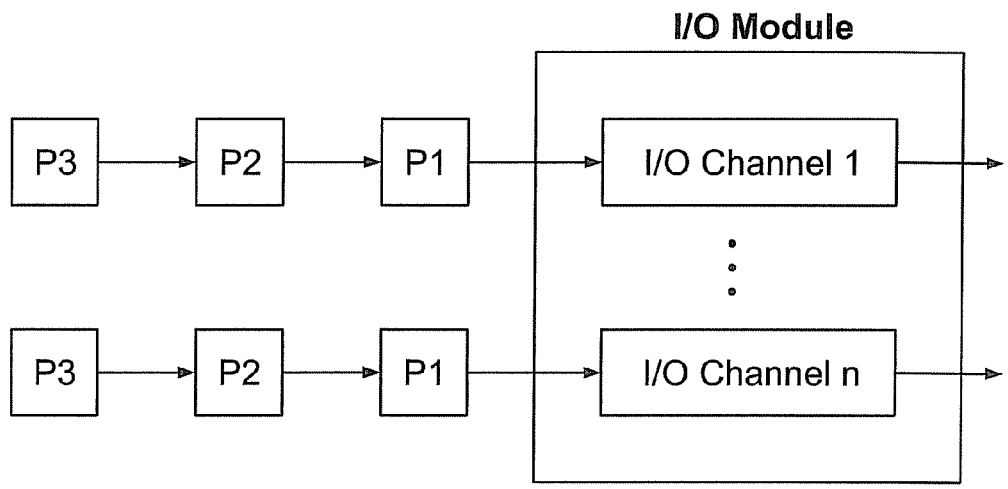
FIG. 10 shows an unsynchronized I/O circuit having two busses according to an example embodiment of the present invention.
Figure 11:
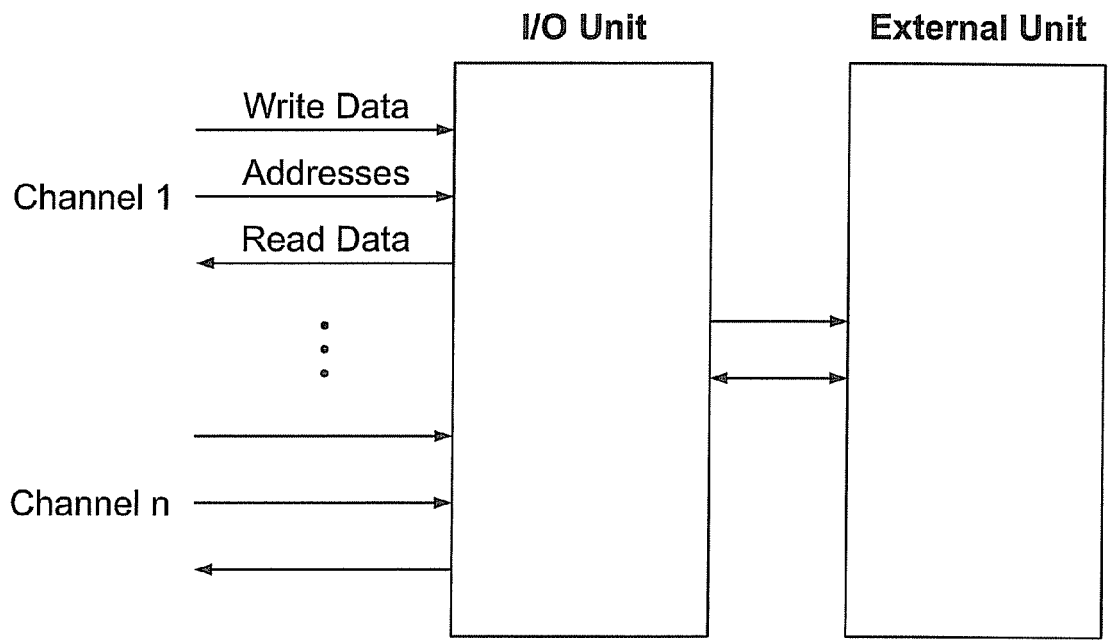
FIG. 11 shows a synchronized I/O circuit having two busses according to an example embodiment of the present invention.

The input/output modules are likewise adapted in their structure in a particular way to the requirements of the data processing task. For this purpose, each of the input/output modules is provided with several channels, that are able to work independently of each other in the so-called PORT mode (FIG. 10) or in synchronization with each other in the so-called RAM mode (FIG. 11). Each I/O module may be used simultaneously by a plurality of algorithms while using a plurality of algorithms, for which sorting algorithms may also be brought in.

In other words, the input/output module (I/O interface) works in memory (RAM) mode (FIG. 11) as an interface to the external memory. In this context, writing data and address data of any channel are synchronized, that is, an external writing operation is started only if both data packets are present. In reading mode, the I/O unit sorts from externally transmitted packets back to the internal channels. The switching between reading and writing mode may occur, for example, via configuration or, for example, via signals.

The invention claimed is:

1. A data processor on a chip comprising:
   an array of processing units, wherein a processing unit comprises either an arithmetic logic unit operative to perform one or more of a plurality of arithmetic operand functions or a memory unit, wherein a first axis of the array of processing units comprises at least one arithmetic logic unit in communication with at least one memory unit;
   at least one interface unit operative to provide at least one communication channel between the data processor and an external memory;
   a bus system flexibly interconnecting the array of processing units for multi-directional communication across the bus system among the array of processing units.

2. The data processor of claim 1, wherein the array is a two dimensional array, the first axis being a horizontal axis and a second axis, the second axis being a vertical axis.

3. The data processor of claim 1, wherein the array is a three dimensional array, the first axis being different from a second axis, the first axis and the second axis each being at least one of an X axis, a Y axis and a Z axis.

4. The data processor of claim 1, wherein the bus system includes:
   a first structure dedicated for data transfer in the first axis; and
   a second structure dedicated for data transfer in a second axis.

5. The method of claim 4, wherein the bus system further includes at least one secondary bus path providing communication between a plurality of the processing units.

6. The method of claim 5, wherein the at least one secondary bus path comprises at least one first-in-first-out buffer for transferring data.

7. The method of claim 1, wherein the bus system supports transmission of at least 32-bit wide data.

8. The method of claim 1, wherein the bus system supports transmission of at least 64-bit wide data.

9. The method of claim 1, wherein the at least one interface unit transfers data between the data processor and an external memory in packets.

10. The method of claim 1, wherein the at least one interface unit supports a plurality of data processor internal data channels.

11. A data processor on a chip comprising:
    a plurality of processing array units disposed in a multidimensional array, wherein a processing array unit comprises either an arithmetic logic unit operative to perform one or more of a plurality of arithmetic operand functions or a memory unit, and wherein at least one memory unit is in operative communication with a plurality of arithmetic logic units;

at least one interface unit operative to provide at least one communication channel between the plurality of processing units;

a bus system flexibly interconnecting the plurality of processing array units for multi-directional communication across the bus system among the plurality of processing array units.

\* \* \* \* \*